3,463,473
INSTALLATION FOR EXTRACTING ZINC FROM FUMES RICH IN ZINC VAPOUR
Pierre Moulin, Pamiers, France, assignor to Société Metallurgique d'Imphy, Paris, France, a company of France
Filed Dec. 22, 1966, Ser. No. 603,959
Claims priority, application France, Jan. 7, 1966, 45,147
Int. Cl. C22b 19/08, 19/18
U.S. Cl. 266—18
6 Claims

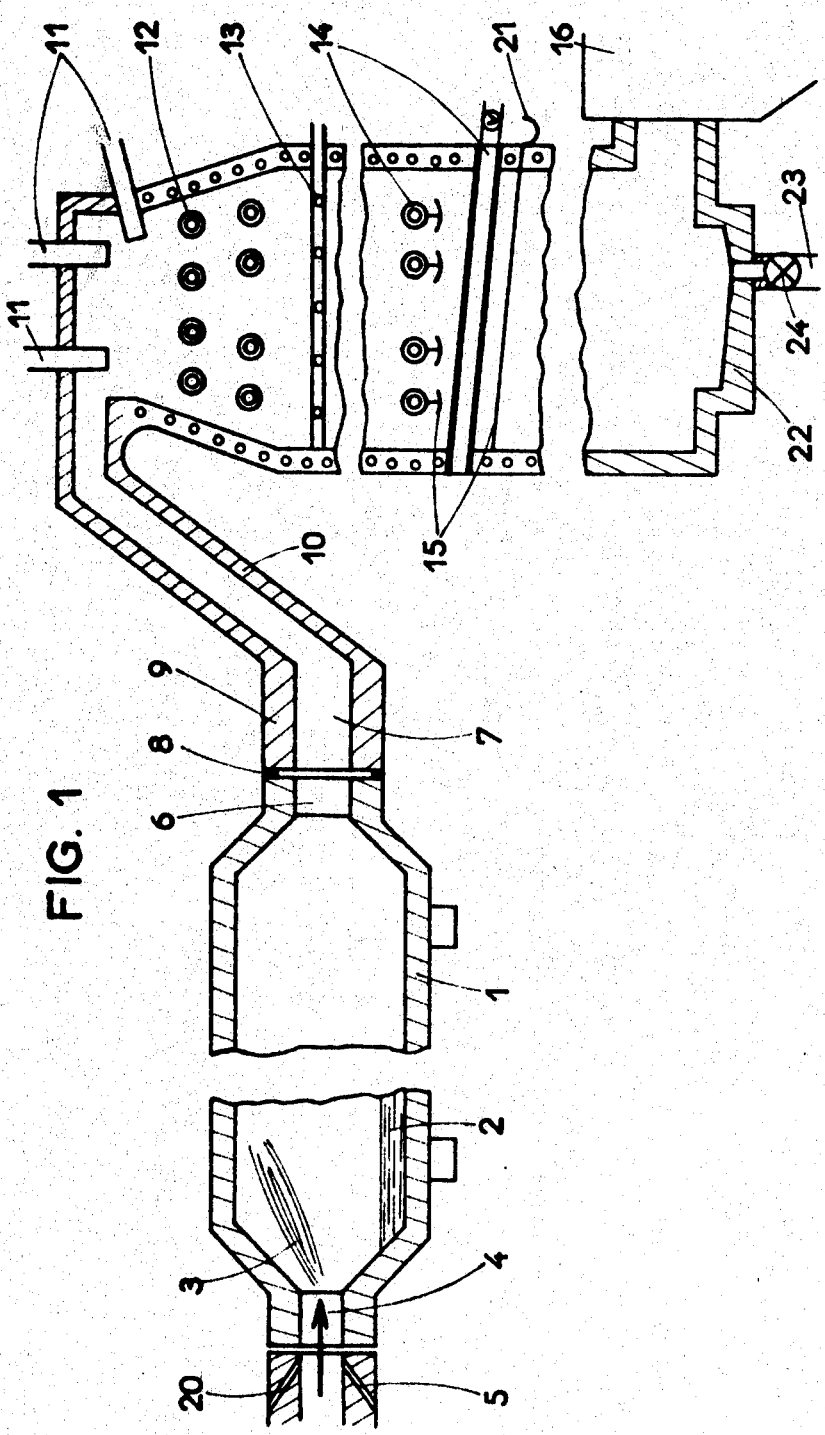

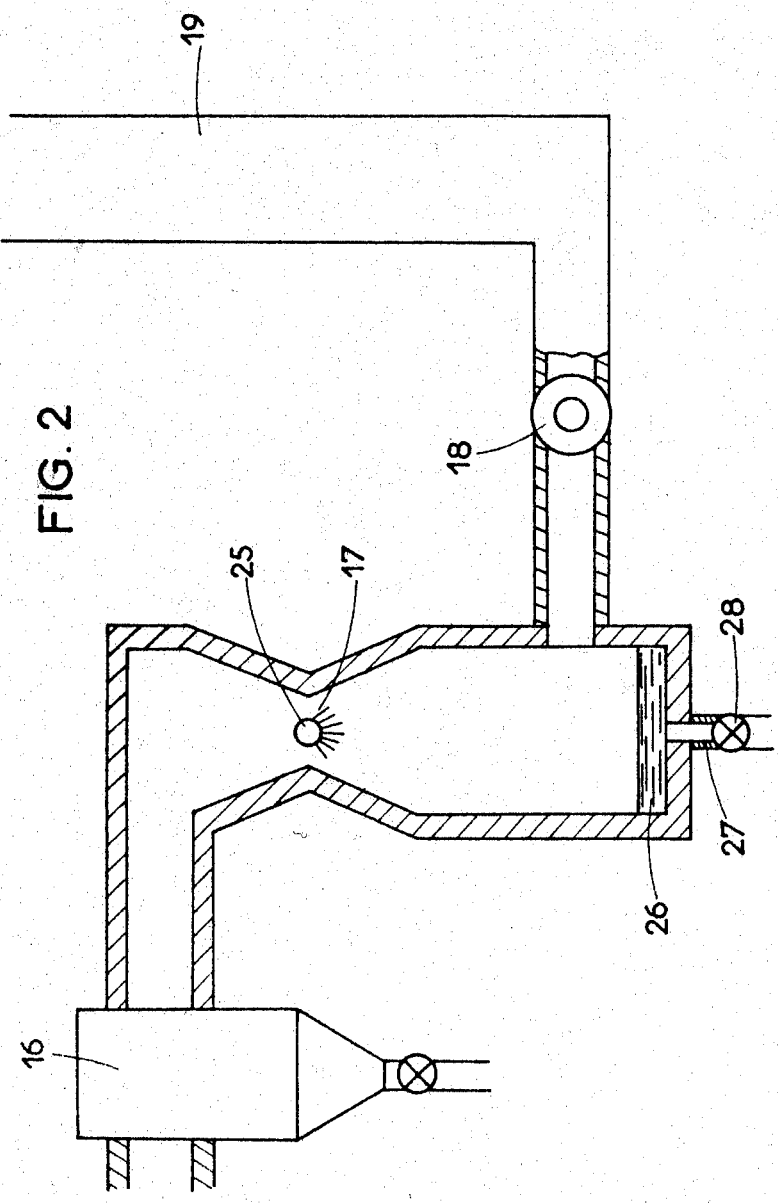

ABSTRACT OF THE DISCLOSURE

This disclosure relates to apparatus for the production of zinc from fumes which are rich in zinc vapour and which are produced, for example, by direct reduction of zinc ores in a rotary furnace disposed with the axis substantially horizontal and heated by an oxidising-flame burner, this apparatus enables zinc to be collected in the liquid state in an excellent yield and is characterised in that it comprises after the furnace outlet and in the path of the fumes a hood which is disposed with the axis substantially vertical and which is provided with tuyeres for the injection of nitrogen into the flow of fumes, means being provided to collect the zinc which passes into the liquid phase.

---

This invention relates to apparatus for producing zinc from fumes which are rich in zinc vapour. Applicants have reduced zinc oxide ore in apparatus comprising a rotary furnace disposed with the axis substantially horizontal, the said furnace being heated by an oxidising flame burner directed into a zone of the furnace other than the reduction zone.

Such furnaces use oxygen as a combustion-supporting agent and are heated by a flame the degree of oxidation of which can be adjusted at will. Because the use of oxygen as combustion-supporting agent allows very high temperatures and the nitrogen-free fumes move at low speed, the gaseous medium formed by the flames can transmit heat to the charge and the walls with only limited chemical exchanges with the charge.

The carbon monoxide produced by the reduction of the metallic oxides by carbon is burned in the gaseous medium and thus makes a considerable heat contribution to the thermal balance of the operation.

In the case of zinc oxides, part may be injected and reduced directly in the flame. The advantage of this technique is that at the high temperatures reached—above 1300° C.—the fumes may contain high proportions of oxidised gases, carbon dioxide and water vapour, while continuing to have a reducing effect with respect to the zinc oxides.

The thermal efficiency is excellent and the resulting fumes are characterised by

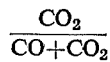

and

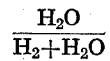

ratios better than 0.8 in the presence of zinc vapour contents of 20%.

At the furnace outlet the fumes have to be subjected to a very vigorous cooling treatment, because the zinc vapours tend to re-oxidise below 1200° C.

Applicants have already proposed a process and apparatus for the production of solid zinc from fumes containing zinc vapours, in a French Patent No. 1,436,671 filed on Mar. 11, 1965 in the name of the Société Metallurgique d'Imphy, the title of the patent being "Process and Apparatus for the Production of Solid Zinc From Fumes Containing Zinc Vapours."

The technique described in that patent comprises cooling by water spray and the production of fine solid zinc particles in the stream of water. These particles may be filtered and lead to subsequent separation by fractional distillation.

The present invention relates to apparatus for improving the recovery of zinc in metallic form and allowing such recovery in the liquid state.

According to the invention, the apparatus includes after the furnace outlet and in the path of the fumes a hood disposed with the axis substantially vertical and provided with tuyeres for the injection of nitrogen into the flow of fumes.

The apparatus will now be described in greater detail with reference to a specific embodiment which is given by way of example and illustrated in the accompanying drawings.

FIGURE 1 is a diagrammatic view of a first part of the apparatus situated at the outlet of a furnace producing fumes rich in zinc vapour.

FIGURE 2 shows a second part of the apparatus adapted to be disposed after the first and complete its effects.

FIGURE 1 shows a rotary furnace 1 disposed with the axis horizontal and holding a bath 2 containing a zinc oxide and a reducing agent such as cool. The furnace is heated by a flame 3 fed by natural gas which is totally or partially decomposed and injected in the direction of arrow 4, in the presence of industrial oxygen introduced via conduit 5.

Some of the powdered zinc ore can be injected directly into the gases via a special tuyere 20, industrial oxygen preferably being used as carrying gas. This zinc ore portion is reduced by the carbon monoxide evolved from the bath 2 and by the hydrogen of the fumes.

The very hot fumes are at a temperature between 1300 and 1800° C., depending upon the required zinc recovery degree, and emerge at 6 and pass to a conduit 7. A gasket 8 is provided between the furnace 1, which rotates about its horizontal axis, and the conduit 7 which remains stationary. The gasket must be of a refractory material to withstand the high temperatures.

If the temperature of the fumes reaching the conduit 7 is about 1350 to 1500°, it is preferable to make the conduit of a refractory material to form a first horizontal part 9 and then a second upwardly inclined part 10 so as to maintain an adequate temperature as far as the zinc vapour quenching hood.

If the temperature of the emerging fumes is higher, it is possible just to use a fume drawing hood of sheet steel cooled by a water circulation of the same type as used in oxygen steel-plant hoods.

Conduit 10 leads into a vertical hood to which it supplies fumes at a temperature of the order of 1300 to 1350° C. The section of the hood increases considerably from the top level and over a certain height of the hood. Water-cooled tuyeres 11 penetrate into the hood and inject into the same nitrogen at the lowest possible temperature. The tuyeres are so directed and the injection is so carried out as to ensure very complete mixing of the fumes and the nitrogen. The tuyeres 11 may be of a water-cooled metal.

Following the nitrogen introduction zone, the hood consists of steel plates resistant to high-temperature zinc fumes, e.g. ferritic stainless steel plates.

Tubes of refractory alloys or carborundum bricks 12 extend through the hood and carry the liquid zinc fraction recovered lower down in the apparatus. The tubes 12 allow the volatilisation of the liquid zinc for subsequent refining by distillation.

Low-delivery spray banks 13 are provided beneath the tubes 12 to control the fume temperature and hold it between 500 and 700° C. in this zone. Beneath the spray banks 13 and towards the central part of the hood the apparatus comprises rows of slightly inclined tubes 14 which are intercrossed with respect to one another. These tubes, which are preferably made of ferritic stainless steel, may be provided with suspended gutters 15 made of the same material, e.g. the same steel.

The tubes 14 carry a coolant and the gutters 15 collect the condensed zinc which flows off in the liquid state and is collected outside in troughs 21.

The tubes 14 and the gutters 15 may be replaced by cups cooled internally by an air stream and kept at a temperature which, depending upon their height in the hood, will range from 520° C. for the highest to 380° C. for the lowest.

The sprayed water accompanied by metallic zinc particles is collected at the base of the hood on an inclined bottom 22, from which it can be withdrawn via a conduit 23 containing a cock 24. The bottom part of the hood leads out into a cyclone 16 intended to separate the largest metal droplets.

Beyond this (FIGURE 2) the conduit is in the form of a convergent-divergent nozzle 17 containing high power water spray banks 25. The object of this spray is to eliminate the last trace of metal from the fumes. The water and the metal are collected at 26 at the base of the apparatus from which they can be withdrawn via a conduit 27 containing a cock 28. The fumes then pass through an intake fan 18 and are delivered to the chimney 19.

In an apparatus of the above-described type, the zinc recovery is carried out in four zones.

It is first recovered in the liquid state in the troughs 21.

The normally cooled tubes 14 cause zinc to be deposited in the solid state on their surface.

The cooling of the tubes 14 is interrupted at regular intervals and the zinc covering then melts and collects in the liquid state in the gutters 15 and then flows off to the troughs 21. The zinc recovered in this way is oxidised only to a very small degree.

If the tubes 14 and gutters 15 are simply replaced by cooled cups or gutters, the zinc can be recovered continuously with a lead content which will vary according to their temperature levels.

A second zinc recovery zone is in the liquid state in the crucible provided at 22.

A third recovery zone is the base of the cyclone 16 where the zinc collects in the solid state.

Finally, there is a last recovery zone in the wash tanks 26, where the zinc is in the powdered and partially oxidised state.

One example of an apparatus according to the invention of the type shown in FIGURES 1 and 2 will now be described.

The horizontal furnace 1 had an outside diameter of 1.60 metres and an effective length of 4.20 metres. This furnace was designed to produce 2 tons of metal per hour with a coke dust consumption of 650 kg. per hour and a 97% oxygen content industrial gas consumption of 1200 $Nm.^3$ per hour and a natural gas consumption of 280 $Nm.^3$ per hour.

A furnace of this type fed in this way produced 1780 $Nm.^3$ of fumes per hour with the following composition apart from the zinc:

$CO_2$: 55% i.e., 940 $Nm.^3$ per hour. CO: 14% i.e., 240 $Nm.^3$ per hour. $H_2O$: 25% i.e., 420 $Nm.^3$ per hour $H_2$: 6% i.e., 100 $Nm.^3$ per hour.

These fumes entrained a zinc vapor volume equivalent to 20% of their own volume. The temperature measured before the nitrogen introduction zone, i.e. at the entry to the hood, was 1300° C. The nitrogen injection was 4800 $Nm.^3$ per hour of gas at a temperature of −80° C. The fraction of gas recycled in the liquid state by distillation refining was 30% of the total. The water spray banks 13 had a consumption of about 40 kg. of water per hour and the temperature of the gases beneath the ramps 13 was about 620° C. The recovered zinc fraction in the zone of the tubes 14 and gutters 15 was about 85%.

Subsequent cooling of the fumes was by the cooled walls of the apparatus and by injection of water, more particularly by means of the banks 25, which had a consumption of about 300 kg. of water per hour.

The cyclone 16 recovered approximately 10% of the zinc in the metallic state, recovery of the fine particles of varying degrees of oxidation being carried out downstream of the convergent-divergent nozzle 17, such recovery being of the order of 3 to 4%.

The height of the recovery hood was about 10 meters with an inside width of 3 metres. The fume extraction fan 18 was driven by a 100 k.w. motor.

Of course the invention is not limited to the above-described embodiment details which can be modified without departing from the scope of the invention.

What we claim is:

1. Apparatus for the production of zinc from fumes rich in zinc vapour produced by direct reduction of zinc ore in a rotary furnace having a substantially horizontal axis and heated by an oxidising flame burner, the flame being directed into a zone other than the reduction zone, comprising a furnace outlet, an outlet conduit connected to said outlet, a hood connected to said outlet conduit in the path of the fumes from the furnace, said conduit opening into the top of said hood, said hood having a substantially vertical axis means including at least one tuyere in said hood for the injection of nitrogen into the flow of the fumes in the direction of the flow of the fumes, cooling tubes in the central interior part of said hood for the condensation of zinc, exacuation gutters in said central part for collecting zinc condensed on said tubes and means for stopping the cooling of said tubes at regular intervals.

2. Apparatus for the production of zinc from fumes rich in zinc vapour produced by direct reduction of zinc ores in a rotary furnace having a substantially hroizontal axis and heated by an oxidizing flame burner, the flame being directed into a zone other than the reduction zone, comprising a furnace outlet, an outlet conduit connected to said outlet, a hood connected to said outlet conduit in the path of the fumes from the furnace, said conduit opening into the top of said hood, said hood having a substantially vertical axis, means including at least one tuyere in said hood for the injection of nitrogen into the flow of the fumes in the direction of the flow of the fumes, cooling means in the central interior part of said hood for the condensation of zinc, evacuation means in the central part of said hood for collecting the condensed zinc and means for stopping said cooling means at regular intervals.

3. Apparatus according to claim 1 the upper part of the hood containing refractory tubes for carrying liquid zinc fraction.

4. Apparatus according to claim 1, said cooling tubes being disposed above said zinc-collecting gutters.

5. Apparatus according to claim 1 the bottom part of the hood communicating with a cyclone for the separation of the solids.

6. Apparatus according to claim 2, cyclone communicating with a convergent-divergent nozzle containing high pressure water spray banks for wet dust-extraction of the fumes.

(References on following page)

References Cited

UNITED STATES PATENTS

| | | | |
|---|---|---|---|
| 3,414,401 | 12/1968 | Fourt | 75—88 X |
| 2,375,932 | 5/1945 | Lohse | 266—18 |
| 3,057,616 | 10/1962 | Wohlfahrt et al. | |
| 3,190,747 | 6/1965 | Namy et al. | 266—31 X |
| 3,271,134 | 9/1966 | Derham | 266—16 X |
| 3,345,057 | 10/1967 | Mitchell et al. | 266—32 X |

FOREIGN PATENTS 1,429,310  1/1966  France.

J. SPENCER OVERHOLSER, Primary Examiner

R. D. BALDWIN, Assistant Examiner

U.S. Cl. X.R.

75—88; 266—34